United States Patent [19]

Suzuki et al.

[11] Patent Number: 5,038,464
[45] Date of Patent: Aug. 13, 1991

[54] FILM MAGAZINE ASSEMBLING SYSTEM

[75] Inventors: Chiaki Suzuki; Shigehisa Shimizu, both of Kanagawa, Japan

[73] Assignee: Fuji Photo Film Co., Ltd., Kanagawa, Japan

[21] Appl. No.: 352,310

[22] Filed: May 16, 1989

[30] Foreign Application Priority Data

May 16, 1988 [JP] Japan ................................ 63-118499

[51] Int. Cl.⁵ ............................................. B23P 19/04
[52] U.S. Cl. ......................................... 29/806; 29/818
[58] Field of Search ................. 29/450, 451, 806, 818, 29/824; 354/267, 276; 242/197; 53/116

[56] References Cited

U.S. PATENT DOCUMENTS

| | | | |
|---|---|---|---|
| 2,940,232 | 6/1960 | Wallace et al. | 53/116 |
| 3,364,552 | 1/1968 | Napor et al. | 29/806 X |
| 3,586,258 | 6/1971 | Horlezeder | 242/197 |
| 4,115,913 | 9/1978 | Moriya et al. | 29/806 X |
| 4,656,737 | 4/1987 | Shimizu et al. | 29/806 |

FOREIGN PATENT DOCUMENTS

| | | |
|---|---|---|
| 52115215 | 9/1977 | Japan . |
| 59143841 | 8/1984 | Japan . |
| 1283214 | 7/1972 | United Kingdom ................. 29/806 |

Primary Examiner—Joseph M. Gorski
Assistant Examiner—Peter Dungba Vo
Attorney, Agent, or Firm—Sughrue, Mion, Zinn, Macpeak & Seas

[57] ABSTRACT

A film magazine assembling system includes a plurality of two-part magazine casing assembling chucks. Each chuck is formed of a pair of chuck members the inner surfaces of which substantially form a cylindrical surface in a closed state. In an open state, one of the side edges of one of the chuck members parallel to the longitudinal axis of the cylindrical surface is spaced from the mating edge of the other chuck member. An indexing plate is rotatable about a substantially horizontal rotational axis and supports the magazine casing assembling chucks at regular angular intervals about the rotational axis so that the longitudinal axis of said cylindrical surface is held horizontal. The indexing plate is intermittently rotated by an angle equal to the angular interval, thereby successively stopping each magazine casing assembling chuck at a plurality of stations. The magazine casing assembling chuck is in the open state and opposed side edges of the barrel plate which form the magazine slit is spaced from each other at the first station, and the barrel plate is loaded into the magazine casing assembling chuck so that the side edges are positioned in the space between the spaced side edges of the chuck members.

2 Claims, 3 Drawing Sheets

FILM MAGAZINE ASSEMBLING SYSTEM

BACKGROUND OF THE INVENTION

1. Field of the Invention

This invention relates to a film magazine assembling system which loads a film assembly (a roll film with a spool around which it is wound) into a film magazine casing barrel plate and caps opposite ends of the film magazine casing barrel plate in the manufacturing process of 16 mm film magazine, 35 mm film magazine or the like.

2. Description of the Prior Art

In a conventional film magazine assembling system, the film magazine casing barrel plate is sent to a film assembly feeding station with one end capped and the other end opened, and a film assembly is loaded into the film magazine casing barrel plate. Thereafter, the barrel plate carrying therein the film assembly is sent to a capping station where the other end of the barrel plate is capped.

However, the barrel plate with only one end capped is hard to handle and is apt to cause trouble. For example, the orientation of the barrel plate can change during transfer to the film assembly feeding station or from the film assembly feeding station to the capping station. Further, when the film assembly is loaded into the barrel plate, the film can be folded.

In order to overcome these problems, there has been proposed a system in which the barrel plate is transferred to the film assembly feeding station or the capping station with its longitudinal axis kept horizontal in a state that it is part rolled and the magazine slit thereof is wide open. See Japanese Unexamined Patent Publication No. 59(1984)-143841, for example.

In the system disclosed in the above identified patent publication, the barrel plate in such a state is carried by a pallet mounted on an endless chain and is transferred to the film assembly feeding station or the like. However, when the pallet is mounted on the chain, it is difficult to accurately position the barrel plate carried by the pallet.

SUMMARY OF THE INVENTION

In view of the foregoing observations and description, the primary object of the present invention is to provide a film magazine assembling system which can transfer a part rolled state film magazine casing barrel plate and position it with a high accuracy so that loading of a film assembly into the barrel plate and capping of the barrel plate can be performed easily and accurately.

Another object of the present invention is to provide a capping system and a magazine casing assembling chuck which are particularly suitable for use in the film magazine assembling system.

In accordance with an aspect of the present invention, there is provided a film magazine assembling system comprising a plurality of two-part magazine casing assembling chucks, each comprising a pair of chuck members the inner surfaces of which are a part of a cylindrical surface in shape and which can be selectively brought into a closed state where the chuck members are mated with each other so that the inner surfaces thereof substantially form a cylindrical surface and into an open state where one of the side edges of one of the chuck members parallel to the longitudinal axis of the cylindrical surface is spaced from the mating edge of the other chuck member, an indexing means which is rotatable about a substantially horizontal rotational axis and supports the magazine casing assembling chucks at regular angular intervals about the rotational axis so that the longitudinal axis of said cylindrical surface is held horizontal, an indexing means driving means which intermittently rotates the indexing means by an angle equal to the angular interval, thereby successively stopping each magazine casing assembling chuck at a plurality of stations, a barrel plate feeding means which loads a barrel plate into each magazine casing assembling chuck at a first station, opposed side edges of the barrel plate which form the magazine slit being spaced from each other at the first station, the magazine casing assembling chuck being in the open state and the barrel plate being loaded into the magazine casing assembling chuck so that the side edges are positioned in the space between the spaced side edges of the chuck members, a film assembly feeding means which moves a film assembly comprising a spool and a roll film wound around the spool in the longitudinal direction of the spool and loads the film assembly into the barrel plate carried by the magazine casing assembling chuck when the magazine casing assembling chuck which has been fed with the barrel plate is stopped at a second station, a chuck driving means which brings the magazine casing assembling chuck which has been fed with the barrel plate and the film assembly into the closed state, thereby closing the barrel plate, a capping system which mounts caps on respective ends of the closed barrel plate when the magazine casing assembling chuck carrying thereon the closed barrel plate is stopped at a third station, and a film magazine discharging means which discharges the capped barrel plate with the film assembly accommodated therein from the magazine casing assembling chuck which has been in an open state.

With this arrangement, the barrel plate can be accurately positioned since it is held by a pair of chuck members which substantially form a cylindrical surface when mated with each other.

The present invention further provides a two-part magazine casing assembling chuck which is particularly advantageous in accurately positioning the barrel plate. That is, in accordance with another aspect of the present invention, there is provided a two-part film magazine casing assembling chuck for assembling a film magazine casing having a barrel provided with a magazine slit comprising a pair of chuck members the inner surfaces of which are a part of a cylindrical surface in shape and which can be selectively brought into a closed state where the chuck members are mated with each other so that the inner surfaces thereof substantially form a cylindrical surface and into an open state where one of the side edges of one of the chuck members parallel to the longitudinal axis of the cylindrical surface is spaced form the mating edge of the other chuck member, an edge portion with which a turned edge portion of a barrel plate for forming the magazine slit is to be engaged being provided on said one side edges of said one chuck member, a barrel plate pushing member which resiliently pushes the barrel plate positioned between the chuck members toward said one chuck member being provided on the other chuck member.

When the barrel plate is resiliently pressed against one of the chuck members and the turned edge portion of the barrel plate is brought into engagement with the edge portion of the chuck member, the barrel plate can be positioned with a very high accuracy.

Further, in accordance with still another aspect of the present invention, there is provided a capping system for mounting caps on respective ends of a barrel plate of a film magazine which has been fed with a film assembly consisting of a spool and a roll film wound around the spool and is held so that the spool is substantially horizontally positioned, comprising a cap feeding means which positions a pair of caps to be opposed to the respective ends of the barrel plate, each cap having a boss hole to be engaged with an end of the spool, a pair of guide shafts which are opposed to the respective ends of the barrel plate and is adapted to be moved toward the barrel plate through the boss holes of the caps so that the tip portions of the respective guide shafts are fitted in the respective ends of the spool, a pair of cap pushing means which respectively pushes the caps along the guide shafts toward the ends of the barrel plate so as to be engaged with the respective ends of the barrel plate, and a pair of cap caulking means each of which comprises a plurality of caulking claws which are disposed about an axis and supported so that their tip portions are movable away from and toward the axis, and a claw driving member which moves the caulking claws toward and away from the axis, is moved after said guide shafts are moved away from the barrel plate so that the tip portions of the caulking claws are positioned inside the peripheral wall portion of the cap, and causes the claw driving member to force the claws into the peripheral wall portion of the cap.

Since the capping operation is carried out from each side of the barrel plate in the capping system, two caps are mounted on the respective ends of the barrel plate at one time, thereby increasing the working efficiency. Further, since the caps are slid on the guide shafts when they are fitted on the barrel plate, they cannot fall or incline during the capping operation. Further, since the caps are correctly coaxially located with respect to the spool by the guide shaft, the capping operation can be performed with a high accuracy.

Preferably, the capping system is provided with a confining member which grasps the barrel plate from outside. With this arrangement, the side portion of the barrel plate can prevented from being outwardly deformed under the caulking force exerted thereon by the caulking claws.

DESCRIPTION OF THE PREFERRED EMBODIMENT

Figure 1:
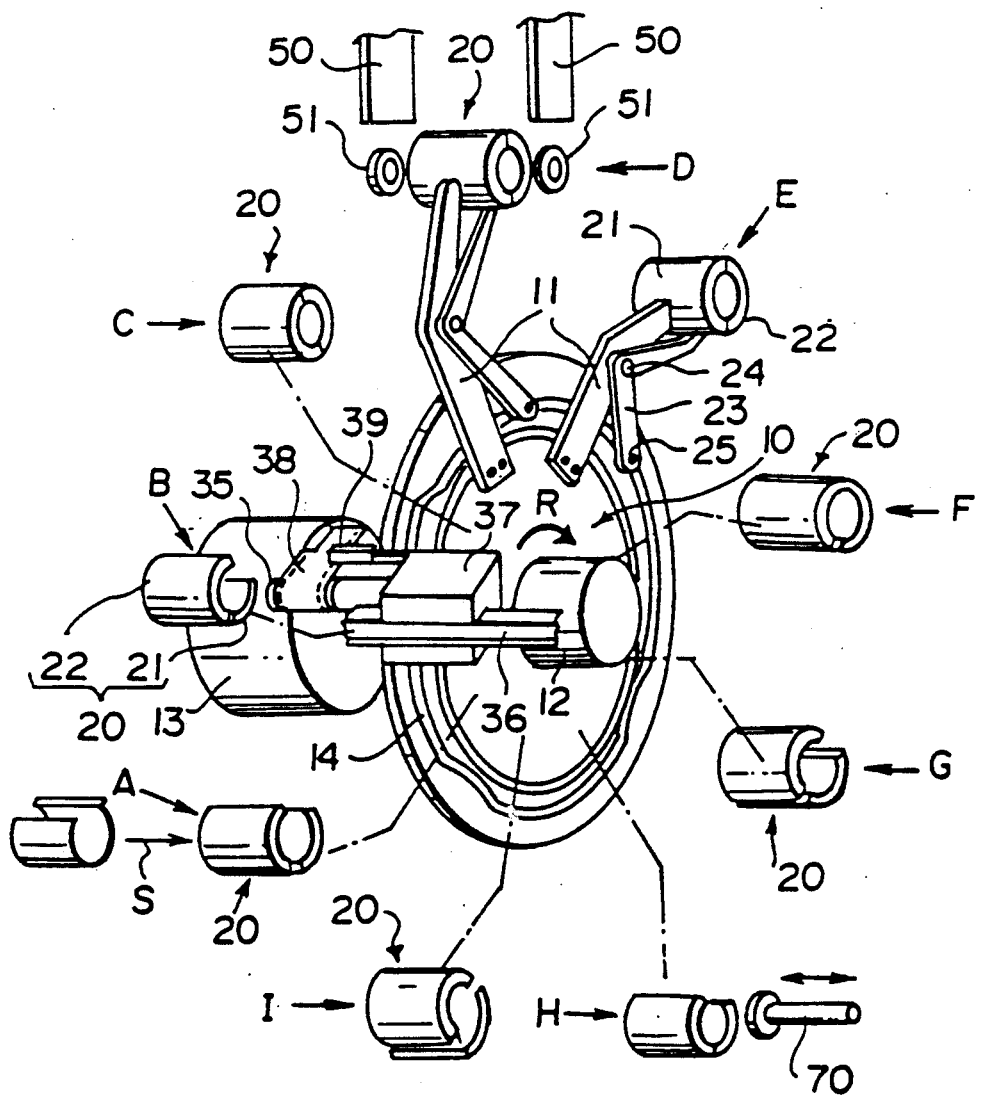
FIG. 1 is a schematic perspective view showing a film magazine assembling system in accordance with an embodiment of the present invention.

In FIG. 1, a film magazine assembling system in accordance with an embodiment of the present invention includes an indexing member 10 which is in the form of a rotary plate rotatable about a rotational shaft 12. Nine support members 11 are fixed to the indexing member 10 at equidistance from the rotational shaft 12 and at regular angular intervals of 40° about the rotational shaft 12. A fixed half 21 of a magazine casing assembling chuck 20 (to be described in detail later) is fixed to each support member 11. The rotational shaft 12 is connected to an indexer driving means 13 and the indexing member 10 is intermittently rotated by 40° in the direction of arrow R in FIG. 1 by the indexer driving means 13.

The other or movable half 22 of the magazine casing assembling chuck 20 is connected to the outer end of a chuck driving lever 23 which is pivoted to the support member 11 by a pivot pin 24 which extends in parallel to the rotational shaft 12. A cam member having an annular cam groove 14 is mounted on the rotational shaft 12 coaxially with the indexing member 10 so that it is rotatable relative to the indexing member 10 and the cam groove 14 surrounds the rotational shaft 12. A cam follower 25 in engagement with the cam groove 14 is mounted on the inner end of the chuck driving lever 23. When the indexing member 10 is rotated about the rotational shaft 12, the chuck driving lever 23 is swung under the guidance of the cam groove 14, whereby the movable half 22 of the magazine casing assembling chuck 20 is moved away from or toward the fixed half 21 in predetermined positions. The same behavior of the movable half 22 can be caused when the cam member is rotated with the indexing member 10 kept stationary.

Figure 2:
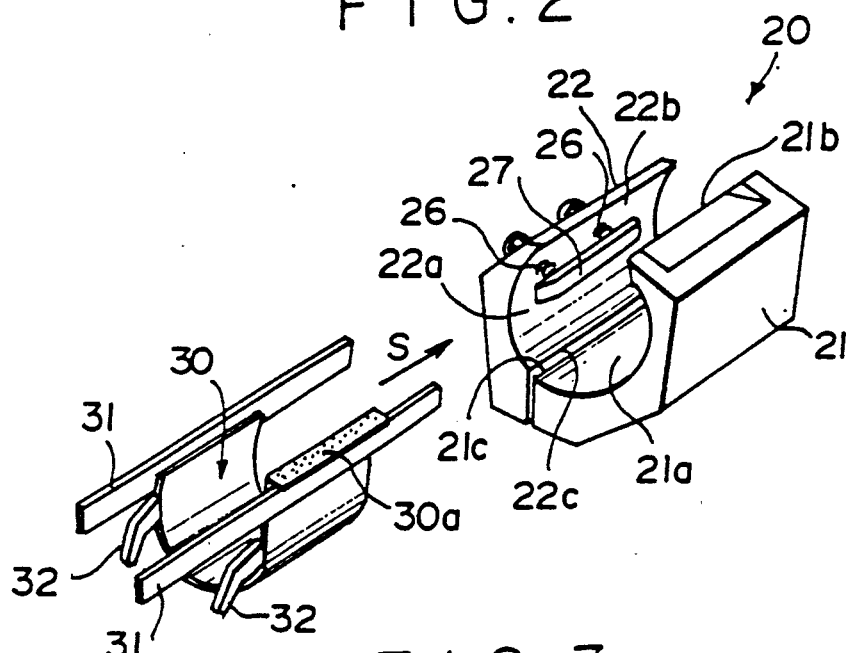
FIG. 2 is an enlarged perspective view showing a part of the system.

The magazine casing assembling chuck 20 will be described in detail with reference to FIG. 2, hereinbelow. The fixed half 21 and the movable half 22 are respectively provided with inner surfaces 21a and 22a which form a part of a cylindrical surface. When the chuck driving lever 23 is swung to a predetermined closing position, the movable half 22 is opposed close to the fixed half 21. This state of the magazine casing assembling chuck 20 will be referred to as "closed state", hereinbelow. In the closed state of the magazine casing assembling chuck 20, first and second side edges 21b and 21c of the fixed half 21 are respectively opposed to first and second side edges 22b and 22c of the movable half 22 with the first side edges 21b and 22b spaced from each other by a predetermined distance, and the inner surfaces 21a of the fixed half 21 and the inner surfaces 22a of the movable half 22 form a substantially cylindrical cavity. On the other hand, when the chuck driving lever 23 is swung to a predetermined opening position, the movable half 22 is moved away from the fixed half 21. This state of the magazine casing assembling chuck 20 will be referred to as "open state", hereinbelow. The first side edge 21b of the fixed half 21 is sharp. A barrel plate pushing bar 27 is provided on the inner surface 22a of the movable half 22 and is urged toward the fixed half 21 by a pair of springs 26.

The indexing member 10 successively brings each magazine casing assembling chuck 20 to first to ninth stations A to I (FIG. 1). In the first station A, the magazine casing assembling chuck 20 is stopped in the open state, and a barrel plate 30 is loaded into the magazine casing assembling chuck 20. The means for feeding the barrel plate 30, which is omitted in FIG. 1, will be described with reference to FIG. 2, hereinbelow. A barrel plate 30 which has been rolled into a predetermined shape is conveyed along a barrel plate guide 31 to the first station A in the longitudinal direction of the magazine casing assembling chuck 20 as stopped at the first station A (the direction of arrow S). At this time, the barrel plate 30 is conveyed with the opening between its opposed side edges (which forms the magazine slit) directed upward. A pair of feeding claws 32 push the barrel plate 30 away from the barrel plate guide 31 into the magazine casing assembling chuck 20 which is in the open state. At this time, the opposed side edges of the barrel plate 30 is positioned between the first side edges 21b and 22b of the fixed and movable halves 21 and 22 of the magazine casing assembling chuck 20. The end portion of the barrel plate pushing bar 27 facing the barrel plate guide 31 is tapered so that it gradually displaces the barrel plate 30 toward the fixed half 21 as the barrel plate 30 is inserted into the magazine casing assembling chuck 20, thereby bringing the barrel plate 30 into close contact with the inner surface 21a of the fixed half 21. This arrangement is advantageous in that the barrel plate 30 can be certainly brought into close contact with the inner surface 21a of the fixed half 21 even if the fixed and movable halves 21 and 22 are relatively wide opened. When the halves 21 and 22 are relatively wide opened, the barrel plate 30 is prevented from impacting against the magazine casing assembling chuck 20 and being damaged.

After the barrel plate 30 is loaded into the magazine casing assembling chuck 20, the indexing member 10 indexes. During the indexing, that is, on the way to the second station B, the magazine casing assembling chuck 20 is partly closed by the chuck driving lever 23. When the magazine casing assembling chuck 20 is partly closed, the barrel plate 30 is pushed toward the fixed half 21 by the pushing bar 27 and the turned edge portion 30a of the barrel plate 30 is brought into engagement with the first side edge 21b of the fixed half 21. When the magazine casing assembling chuck 20 is subsequently opened before it reaches the second station B, the barrel plate 30 is held in close contact with the substantially entire inner surface 21a of the fixed half 21. The barrel plate 30 is thus accurately positioned with respect to the magazine casing assembling chuck 20. The fixed half 21 covers an angle slightly larger than 180°, which contributes toward confining the barrel plate 30 in the fixed half 21.

When the magazine casing assembling chuck 20 carrying thereon the barrel plate 30 reaches the second station B and is stopped there, a film assembly which comprises a spool 35 and a roll film 38 wound around the spool 35 (FIG. 1) is loaded into the barrel plate 30. The spool 35 is held by a pallet 37 in parallel to a guide raid 36 along which the pallet 37 moves. Further, the pallet 37 has a pair of pinch arms 39 (only one of which is seen in FIG. 1) which pinches the leader portion of the roll film 38. When the pallet 37 is moved leftward (as seen in FIG. 1) by a predetermined distance, the film assembly is inserted into the barrel plate 30 while the leader portion of the roll film 38 moves through the opening between the spaced side edges of the barrel plate 30. Then, after the pallet 37 releases the spool 35 and the pinch arms 39 releases the film 38, the pallet 37 is returned rightward leaving the film assembly in the barrel plate 30.

Figure 3:
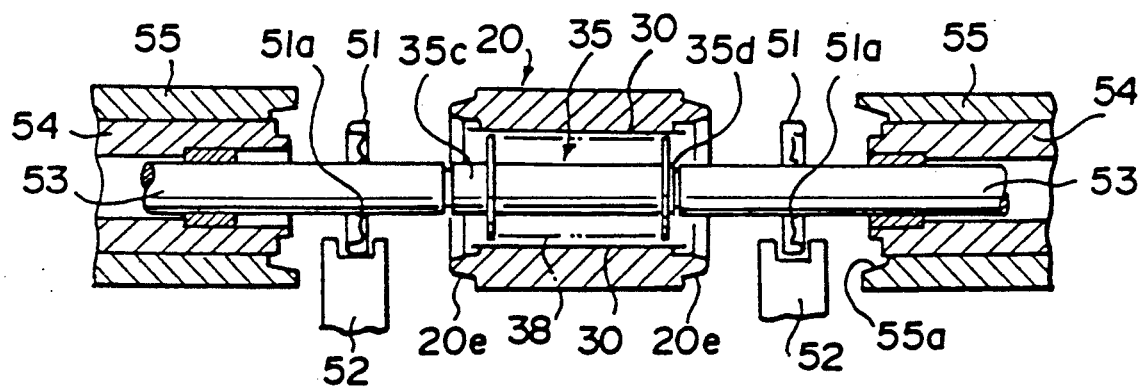
FIGS. 3 and 4 are view for illustrating the operation of the capping system employed in the film magazine assembling system.
Figure 4:
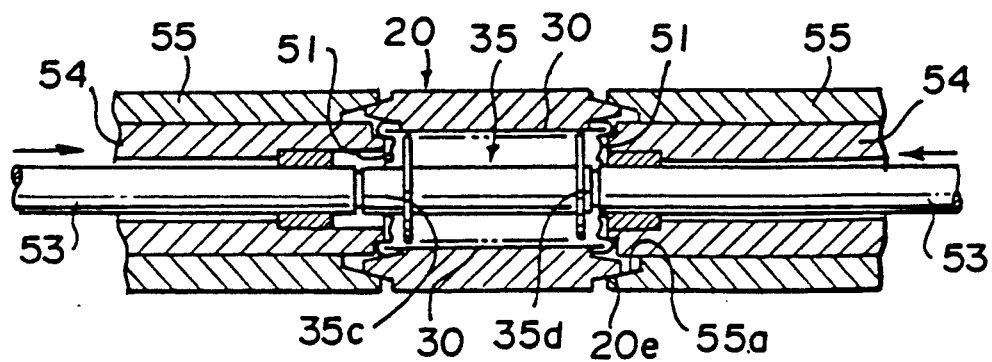
Figure 5:
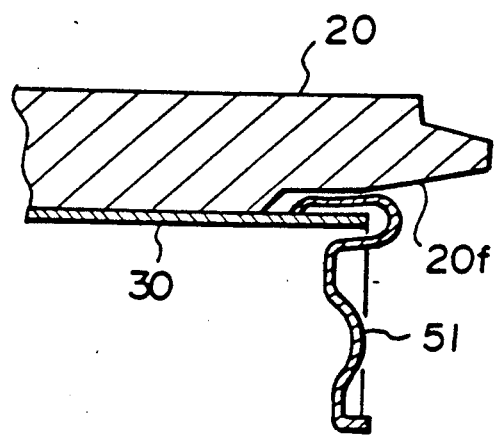
FIG. 5 is a fragmentary cross-sectional view showing a part of the capped barrel plate.

Thereafter, the magazine casing assembling chuck 20 is closed and the barrel plate 30 is thereby closed, and then the magazine casing assembling chuck 20 is sent to the fourth station D through the third station C which is an idle station. At the fourth station D, the barrel plate 30 is capped. The capping operation will be described with reference to FIGS. 3 and 4. A pair of cap chutes 50 are disposed on opposite sides of the magazine casing assembling chuck 20 stopped at the fourth station D. Caps 51 are correctly oriented in the cap chutes 50 and are fed to locator arms 52 on opposite sides of the magazine casing assembling chuck 20 so as to stand erect on the respective locator arms 52 as shown in FIG. 3. The arms 52 are actuated when the caps 51 are fed thereto and bring the caps 51 into alignment with the magazine casing assembling chuck 20. At the fourth station D, a pair of guide shafts 56 which are circular in cross-section are disposed coaxially with each other and spaced from each other by a predetermined distance. A cylindrical cap pushing member 54 is fitted on each guide shaft 53 and a cylindrical cap confining member 55 is fitted on the cap pushing member 54. When the magazine casing assembling chuck 20 is stopped at the fourth station D, the chuck 20 is positioned between guide shafts 53 in alignment with the shafts 53. The shaft 53, the pushing member 54 and the confining member 55 are moved in the longitudinal direction of the guide shaft 53 by driving means which are not shown, and are moveable relative to each other. When the caps 51 are positioned in alignment with the magazine casing assembling chuck 20, the guide shafts 53 are moved toward each other and toward the magazine casing assembling chuck 20 so that the left side guide shaft 53 passes through the boss hole 51a of the left side cap 51 and the tip of the left side guide shaft 53 is fitted into the longer boss portion 35c of the spool 35 and so that the right side guide shaft 53 passes through the boss hole 51a of the right side cap 51 and the tip of the right side guide shaft 53 is fitted into the shorter boss portion 35d of the spool 35. (The tip of the guide shaft 53 is slightly smaller than the other portion in diameter.) Thus the caps 51 are located with respect to the spool 35 and accordingly to the barrel plate 30 which is substantially cylindrical. The state at this time is shown in FIG. 3. Thereafter the locator arms 52 are moved away from the caps 51, and the cap pushing member 54 and the confining member 55 on each side are moved toward the magazine casing assembling chuck 20, whereby the caps 51 are pushed toward the magazine casing assembling chuck 20 along the guide shaft 53. Thus the inner peripheral surface 55a of the leading end portion of each confining member 55 is fitted on the outer peripheral surface 20e of the corresponding end portion of the magazine casing assembling chuck 20 as shown in FIG. 4. The cap pushing members 54 are further moved toward the magazine casing assembling chuck 20 after the confining members 55 are stopped and the left and right caps 51 are fitted on the end portions of the barrel plate 30. When each cap 51 is fitted on the barrel plate 30, the outer peripheral portion of the cap 51 is drawn under the guidance of the inner peripheral surface 20f of the end portion of the magazine casing assembling chuck 20 and is temporarily caulked as shown in FIG. 5. Though a force which urges outward the magazine casing assembling chuck 20 when the caps 51 are fitted on the barrel plate 30, the chuck 20 is prevented from opening since the confining members 55 have been fitted on the chuck 20. Further, since the caps 51 are slid on the guide shafts 53 when they are fitted on the barrel plate 30, they cannot fall or incline during the capping operation. Further, since the caps 51 have been correctly located with respect to the barrel plate 30 by the guide shaft 53, the capping operation can be performed with a high accuracy. Thereafter, the guide shafts 53, the cap pushing members 54 and the confining members 55 are returned to the original position.

Figure 6:
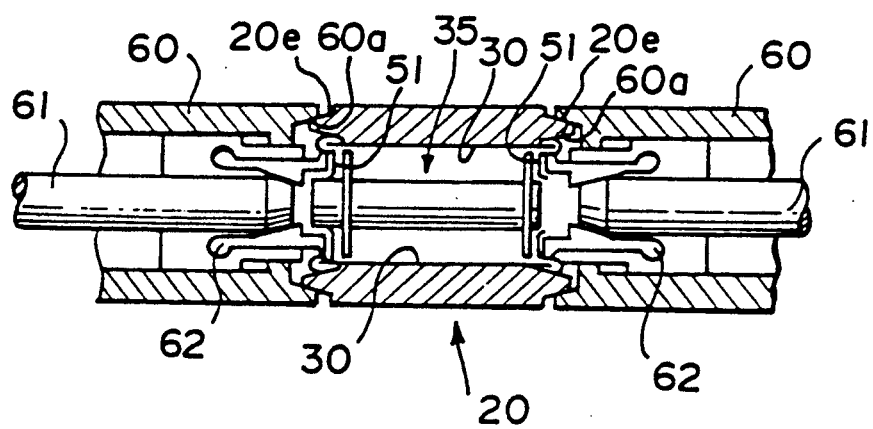
FIG. 6 is a cross-sectional view showing the cap caulking system employed in the film magazine assembling system.

The magazine casing assembling chuck 20 carrying thereon the capped barrel plate 30 is subsequently sent to the fifth station E where the caps 51 are caulked. Since the caps 51 have been temporarily caulked, the caps 51 cannot be removed from the barrel plate 30 during transfer to the fifth station E. The caulking of the caps 51 will be described with reference to FIG. 6, hereinbelow. FIG. 6 shows caulking means which are omitted in FIG. 1. When the magazine casing assembling chuck 20 is stopped at the fifth station E, the chuck 20 is positioned between a pair of caulking units. Each caulking units comprises a cylindrical chuck confining member 60 which is similar to the confining member 55 and is moved toward and away from the magazine casing assembling chuck 20, a claw pushing shaft 61 which is moved back and forth in the longitudinal direction thereof relative to the chuck confining member 60, and a plurality (e.g., eight) of caulking claws 62 disposed about the shaft 61 at regular intervals. The tip portion of each caulking claw 62 is directed radially outwardly of the shaft 61 and is supported to be movable in the radial direction of the shaft 61. The inner surface of the caulking claw 62 is inclined inwardly toward the barrel plate 30 and the tip portion of the shaft 61 is tapered so as to conform to the inclination of the inner surface of the caulking claws 62. When caulking the caps 52, the caulking units are moved toward the magazine casing assembling chuck 20 so that the inner peripheral surface 60a of the tip portion of each confining member 60 is fitted on the outer peripheral surface 20e of the magazine casing assembling chuck 20 as shown in FIG. 6. At this time, the tip portions of the caulking claws 62 are positioned inside the peripheral wall portion of the cap 51. When the claw pushing shafts 61 are subsequently moved toward the magazine casing assembling chuck 20, the claws 62 are pushed radially outwardly by way of engagement of the tapered tip portion of the shaft 61 and the inclined inner surfaces of the claws 62, and the peripheral wall portion of the caps 51 are bent outwardly, whereby the two caps 51 are simultaneously caulked to the barrel plate 30. Also in this case, the chuck 20 is prevented from opening since the confining members 60 have been fitted on the chuck 20. When the caulking operation is completed, the caulking units are moved away from the magazine casing assembling chuck 20.

Thereafter, the indexing member 20 is operated and the magazine casing assembling chuck 20 carrying thereon the completed film magazine is sent to the sixth station F. At the station F, it is checked whether the barrel plate 30 is provided with caps on the respective ends. Thereafter, the indexing member 10 brings the magazine casing assembling chuck 20 to the seventh station G, where the chuck center is checked. Thereafter, the magazine casing assembling chuck 20 is brought to the eighth station H by the indexing member 20 and is opened at the station H. A magazine discharging means 70 is then operated and discharges the completed film magazine in the magazine casing assembling chuck 20 onto a belt conveyor, for instance. The magazine discharging means 70 may comprise rod-like member which is pushed into the magazine casing assembling chuck 20 in the longitudinal direction of the chuck 20.

Thereafter, the magazine casing assembling chuck 20 is brought to the ninth station I, where residue in the chuck 20 is removed. Then the magazine casing assembling chuck 20 is returned to the first station A, and the operations described above are repeated while the magazine casing assembling chuck 20 is transferred from station to station.

We claim:
1. A film magazine assembling system comprising:
a plurality of two-part magazine casing assembling chucks, each magazine casing assembling chuck comprising a pair of first and second chuck members, the inner surfaces of said first and second chuck members are a part of a cylindrical surface in shape, and said first and second chuck members can be selectively brought into a closed state where the first and second chuck members are mated with each other so that the inner surfaces thereof substantially form a cylindrical surface and also into an open state where a side edge of said first chuck member parallel to the longitudinal axis of the cylindrical surface is spaced from a mating edge of said second chuck member,
an indexing means which is rotatable about a substantially horizontal rotational axis, said indexing means supports the magazine casing assembling chucks at regularly spaced, angular intervals about said substantially horizontal rotational axis so that the longitudinal axis of said cylindrical surface is held horizontal,
an indexing means driving means which intermittently rotates the indexing means by an angle equal to said regularly space, angular intervals, thereby successively stopping each magazine casing assembling chuck at a plurality of stations,
a barrel plate feeding means which loads a barrel plate into each magazine casing assembling chuck at a first station, opposed side edges of the barrel plate which form a magazine slit being spaced from each other at the first station, the magazine casing assembling chuck being in the open state and the barrel plate being loaded into the magazine casing assembling chuck so that the side edges of the barrel plate are positioned in the space between spaced side edges of the first and second chuck members,
a film assembly feeding means which moves a film assembly comprising a spool and a roll film wound around the spool in the longitudinal direction of the spool and loads the film assembly into the barrel plate carried by the magazine casing assembling chuck when the magazine casing assembling chuck which has been fed with the barrel plate is stopped at a second station,
a chuck driving means which brings the magazine casing assembling chuck which has been fed with the barrel plate and the film assembly into a closed state, thereby closing the barrel plate,
a capping system, comprising a guide shaft means for guiding caps relative to a position of said spool in said barrel plate, wherein said capping system mounts caps on respective ends of the closed barrel plate when the magazine casing assembling chuck carrying thereon the closed barrel plate is stopped at a third station, and a film magazine discharging means which discharges the capped barrel plate with the film assembly accommodated therein from the magazine casing assembling chuck when said magazine casing assembly chuck being in the open state.

2. A film magazine assembling system comprising, a plurality of two-part magazine casing assembling chucks, each magazine casing assembling chuck comprising a pair of first and second chuck members the inner surfaces of which said first and second chuck members are a part of a cylindrical surface in shape and said first and second chuck members can be selectively brought into a closed state where the first and second chuck members are mated with each other so that the inner surfaces thereof substantially form a cylindrical surface and also into an open state where a side edge of said first chuck member parallel to the longitudinal axis of the cylindrical surface is spaced from a mating edge of said second chuck member, an indexing means which is rotatable about a substantially horizontal rotational axis, said indexing means supports the magazine casing assembling chucks at regularly spaced, angular intervals about said substantially horizontal rotational axis so that the longitudinal axis of said cylindrical surface is held horizontal, an indexing means driving means which intermittently rotates the indexing means by an angle equal to said regularly spaced, angular intervals, thereby successively stopping each magazine casing assembling chuck at a plurality of stations, a barrel plate feeding means which loads a barrel plate into each magazine casing assembling chuck at a first station, opposed side edges of the barrel plate which form a magazine slit being spaced form each other at the first station, the magazine casing assembling chuck being in the open state and the barrel plate being loaded into the magazine casing assembling chuck so that the side edges of the barrel plate are positioned in the space between spaced side edges of the first and second chuck members, a film assembly feeding means which moves a film assembly comprising a spool and a roll film wound around the spool in the longitudinal direction of the spool and loads the film assembly into the barrel plate carried by the magazine casing assembling chuck when the magazine casing assembling chuck which has been fed with the barrel plate is stopped at a second station, a chuck driving means which brings the magazine casing assembling chuck which has been fed with the barrel plate and the film assembly into a closed state, thereby closing the barrel plate, a capping system which mounts caps on respective ends of the closed barrel plate when the magazine casing assembling chuck carrying thereon the closed barrel plate is stopped at a third station, a film magazine discharging means which discharges the capped barrel plate with the film assembly accommodated therein from the magazine casing assembling chuck when said magazine casing assembly chuck being in the open state, and a barrel plate pushing member means, provided on said first chuck member, for pushing said barrel plate positioned between said first and second chuck members towards said second chuck member.

* * * * *